Figure 1:
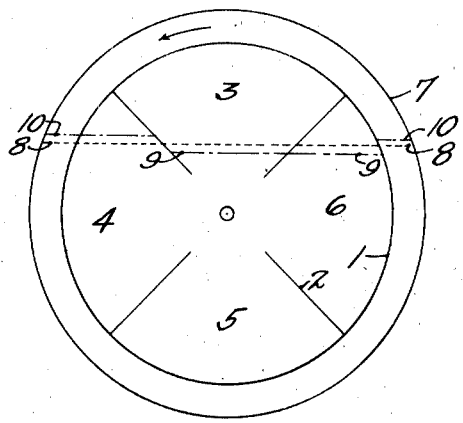

C. W. HINMAN.
GAS HANDLING APPARATUS.
APPLICATION FILED APR. 1, 1918.

1,341,056.

Patented May 25, 1920.

Witness
J. L. O'Neil

Inventor
Charles W. Hinman
by his attorneys
Van Ernst Fish & Hildreth

UNITED STATES PATENT OFFICE.

CHARLES W. HINMAN, OF WINCHESTER, MASSACHUSETTS.

GAS-HANDLING APPARATUS.

1,341,056. Specification of Letters Patent. Patented May 25, 1920.

Application filed April 1, 1918. Serial No. 226,011.

*To all whom it may concern:*

Be it known that I, CHARLES W. HINMAN, a citizen of the United States, residing at Winchester, in the county of Middlesex and State of Massachusetts, have invented certain new and useful Improvements in Gas-Handling Apparatus; and I do hereby declare the following to be a full, clear, and exact description of the invention, such as will enable others skilled in the art to which it appertains to make and use the same.

The present invention relates to gas handling apparatus and more particularly to that type of apparatus in which it is necessary or desirable to maintain a substantially uniform level of water or other liquid, as, for example, in the case of gas meters of the type in which a drum having gas measuring chambers or compartments is rotated partially submerged in water within a casing. In such meters the water forms one of the boundary walls of the gas measuring compartment so that any variation in the level of the water will result in a variation in the cubical capacity of the compartment. Inasmuch as these meters measure the gas by counting the number of revolutions of the drum as the gas passes through it, each revolution being assumed to deliver the same predetermined amount of gas, any variation in the cubical capacity of the measuring compartments will cause inaccurate measurement. Hence it is necessary in order to insure accuracy that the water level be maintained in the measuring compartments at always the same predetermined height.

It has heretofore been the usual practice to regulate the height of the water in the casing by means of a hand-controlled supply valve and an overflow escape pipe, but such an arrangement is objectionable in that it requires constant attention on the part of an attendant, for every variation in the difference in pressure of the gas as it enters and leaves the meter tends to change the water level in the measuring compartment. Thus, when the pressure of the gas as it enters the meter is increased in order to increase the speed of the meter and of the flow of the gas, such increased pressure will be exerted upon the water in the measuring chamber but not upon the water in the casing which is under the pressure of the gas as it leaves the meter. As a result the water level will be depressed in the chamber and raised in the casing, and water must be admitted to the casing until the water level in the measuring chamber is brought back to normal to insure accurate measurement.

It is the object of the present invention to provide a gas meter or other gas handling apparatus in which the level of the water or other liquid shall be automatically maintained at the predetermined height, irrespective of variations in the pressure of the gas as it enters and leaves the meter.

With this and other objects in view as will hereinafter appear, the present invention consists in the devices and combinations of devices hereinafter described and more particularly defined in the claims.

Figure 2:
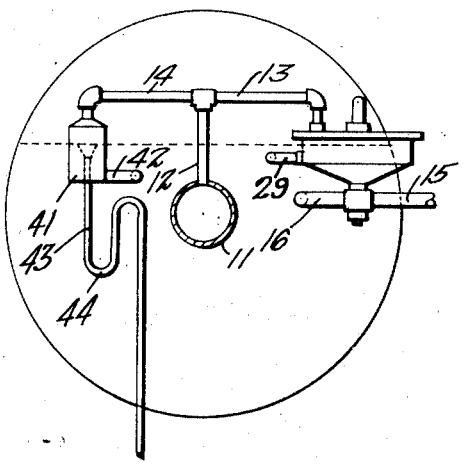
Figure 3:
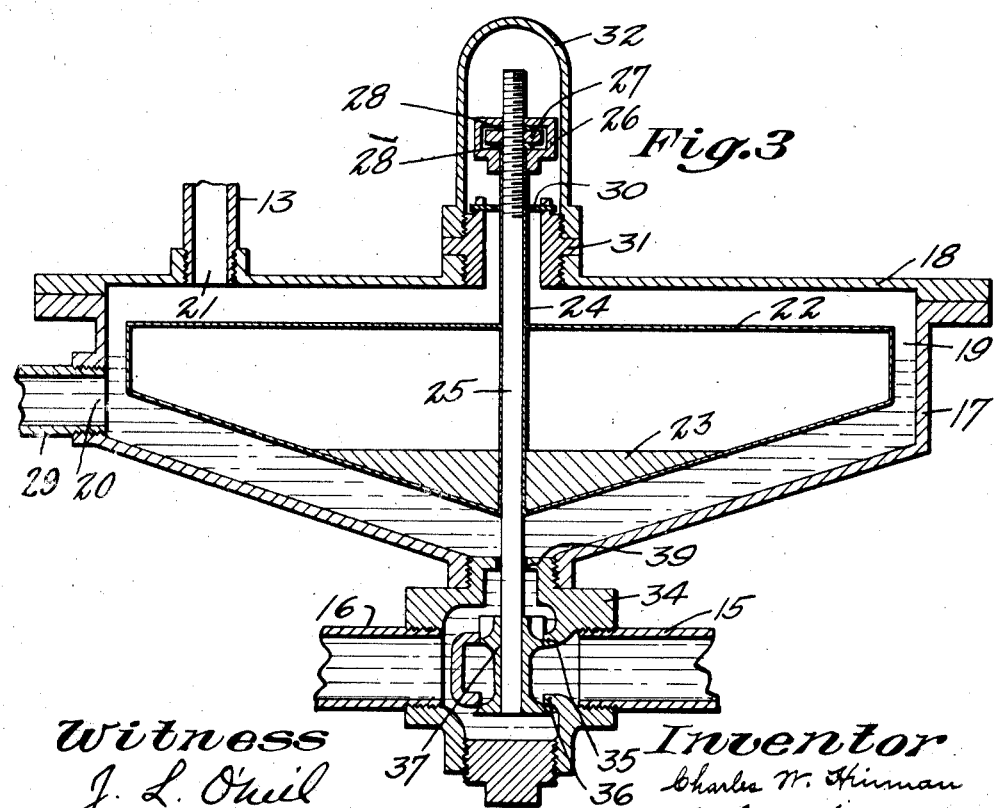

In the accompanying drawings which show what is now considered to be the preferred form of the present invention as embodied in a gas meter, Figure 1 is a diagrammatic view in vertical cross-section of the meter; Fig. 2 is an inlet end elevation of the same; and Fig. 3 is an enlarged vertical section of the water-supply valve mechanism.

In the gas meter of the station type shown in Fig. 1, the rotary drum 1, provided with the radial longitudinal partitions 2 to form the measuring chambers 3, 4, 5 and 6, is mounted in a casing 7. The casing is partially filled with water to such a height that the inner edges of the partitions 2 of the measuring chambers are always submerged, the water thus sealing the measuring chambers and forming one of the boundary walls of the same. The water level when the meter is at rest is indicated in Fig. 1 by the dotted line 8—8.

When the meter is set in operation, gas will be admitted to the measuring chambers successively at the inlet end and discharged from the discharge end in the manner well known to those skilled in this art. Inasmuch as the pressure of the gas is relied upon to rotate the meter, there is a difference of pressure between the inlet and the discharge ends of the meter, and this difference in pressure produces a difference of water level in the different measuring chambers and the casing. For example, assuming that the drum is rotating in the direction of the arrow in Fig. 1, compartment 3 will then be fully charged with gas under the inlet pressure. Compartment 6 will be rising and receiving gas. Compartment 4 will be descending and discharging gas into the casing 7, from which it will be conducted away in the usual manner. Since compartments 3 and 6 contain gas under the inlet pressure, while compartment 4 and casing 8 contain gas under the discharge pressure, the water level in compartments 3 and 6 will be depressed, as shown at 9—9, while the water level in compartment 4 and casing 7 will be raised, as shown by lines 10—10, the difference between the two levels corresponding to the difference in the pressure between the inlet and the discharge gas, that is, the pressure absorbed in driving the meter.
With station meters the gas is usually delivered to the meter through a blower or exhauster or other pressure producing device, and when the demand for gas increases the blower is speeded up, giving an increased pressure to the gas and causing a more rapid rotation of the drum 1 of the meter. The increased pressure of the gas supply will be imparted to the gas in compartments 3 and 6, and as a result the water level in these compartments will be still further lowered, while that in compartment 4 and casing 8 is correspondingly raised. A similar result follows from a drop in the discharge pressure. Thus, every time the pressure of the gas as it enters or leaves the meter varies, the water level in the measuring compartments tends to change, and unless this tendency is overcome and the level maintained at substantially the normal predetermined height, the capacity of the compartments will be altered and the accuracy of measurement impaired.

In the construction illustrated in the drawings, the water in the measuring chambers charged with gas is maintained at the predetermined normal height by means of an automatically operating valve in conjunction with an overflow escape pipe, the valve admitting the water to the casing whenever the level in the measuring chambers falls below the normal height, and continuing to admit water until the level is restored, and the overflow pipe permitting water to be discharged from the casing whenever the level in the measuring chambers is above the normal height.

In Fig. 2, which is an elevation of the inlet end of the meter, is shown in cross section the gas supply or inlet pipe 11, which is in communication with the measuring compartments as they are being charged with gas in the manner well known to those skilled in this art. Leading from this gas supply pipe is the vertical pipe 12 with the right and left-hand branches 13 and 14. Branch 13 leads to the valve mechanism which controls the supply of water from the water supply pipe 15 through the pipe 16 into the casing of the meter, while branch 14 leads to the overflow escape pipe.

The valve mechanism, as shown in detail on an enlarged scale in Fig. 3, comprises a cup-shaped body or casting 17 closed at the top by the air-tight cover 18 to form a float chamber 19, adapted to be partially filled with water. An outlet port 20 in the wall of the casting 17, located below the normal level of the water, is in connection through the pipe 29 with the interior of the casing 7 below the water level, so that water may flow in either direction between the float chamber and the casing. A gas inlet port 21 in the cover 18 is connected with the branch pipe 13, thus bringing the float chamber above the water into communication with the gas supply in the inlet pipe 11. Since the gas measuring compartments such as 3 and 6 of the drum are also in communication with the gas supply, the same gas pressure and the same water level will be maintained in the float chamber as in the measuring chambers, and as the water level in the measuring chambers varies on account of variations in pressure of the gas or for any other reason, the same variations in water level will occur in the float chamber. These variations of water level in the float chamber are availed of to control the supply of water to the casing to raise the water level in the measuring compartments from a sub-normal to normal height in the following manner.

Located within the float chamber 19 and floating upon the water is the hollow float 22 with the weighted bottom portion 23. This float is fixed upon the sleeve 24 which loosely surrounds a valve rod 25. Secured upon the upper end of the sleeve is the yoke piece 26 having a hole in its top portion through which the threaded end of the valve rod freely passes. Mounted upon the threaded end of the valve rod and within the yoke 26 is the knurled thumb nut 27 which projects laterally on each side of the yoke piece and which engages the top and bottom of the said yoke piece through spacing washers 28. By this arrangement a simple and easy adjustment is effected between the float valve 24 and the valve rod 25 to bring the float and valve into the proper relative positions.

The sleeve and rod are positioned at their upper ends by the guide member 30 carried by the sleeve or bushing 31 screwed into the casing of the cover 18. An air-tight cap 32 is screwed on to the top of the bushing to prevent leakage of gas from the float chamber.

The bottom of the float chamber at its center is provided with a threaded aperture into which is screwed a valve casing 34 provided with the upper and lower valve seats or faces 35 and 36 for the balanced valve 37 secured to the lower end of the valve rod 25. Tapped into one side of the valve casing 34 is the water supply pipe 15 leading from any suitable source of supply, while on the opposite side is the pipe 16 leading into the casing 7 of the meter. To prevent any considerable flow of water from the interior of the valve casing 34 up into the float chamber when the valve is open, the upper portion of the valve casing is provided with an internal flange 39 through which the valve rod 25 passes with sufficient clearance to insure free and easy action, it being desirable to avoid all friction so far as possible in order that the sensitiveness of the mechanism may not be reduced.

It is obvious that when the water level in the float chamber 19 is lowered, the float will fall, the valve be opened, and water be admitted from water supply pipe 15 through pipe 16 into the casing of the meter, and this admission will continue until the water level in the float chamber (and in the gas measuring compartments as well), is raised to its original and normal level, when the float will be raised, the valve closed and the water supply cut off.

When the gas pressure in the gas supply and in the measuring compartments is diminished, the water level in the compartments which has heretofore stood at the predetermined normal height, will be raised, and it is then necessary to draw off water from the casing in order to bring the level back to its normal position. This is done by means of the overflow escape pipe arrangement shown in Fig. 2, which comprises a chamber 41 connected at its top through the branch pipe 14 with the gas supply pipe 11, and at its bottom through the pipe 42 with the casing 7 below the water level. The water in the chamber 41 will always stand at the same level as in the gas measuring compartments, as it will be under the same gas pressure. Within the chamber 41 and with its mouth at exactly the desired level for the water in the gas measuring compartments, is the open escape pipe 43 having the trap or bend 44 to provide a water seal for preventing the escape of gas. Whenever the water level in the chamber 41 rises above the mouth of pipe 43, water will escape through said pipe until the level is brought back to the predetermined height.

The operation of the meter and valve mechanism illustrated in the drawings is as follows: Whenever the water level in the gas measuring compartments falls below the predetermined level, either from an increase of pressure of the gas as it enters the meter, or from a decrease of pressure as it leaves, or from leakage of water, or from any other reason, the level in the float chamber of the valve will be correspondingly lowered and water will be admitted until the level is restored. Whenever the level in the measuring chambers rises above the predetermined level, water will escape through the overflow escape pipe until the level is brought down to the desired height. Thus the water level in the measuring chambers is automatically maintained at the same predetermined height irrespective of variations in the pressure of the gas as it enters and leaves the meter, and the cubical capacity of the measuring chambers remains unchanged and the accuracy of the meter unimpaired.

By making the float chamber 19 of relatively large diameter as compared with the pipe 29 through which it communicates with the interior of the casing the momentary disturbances of the water due to the movement of the drum in the casing are so reduced that they are without effect in said chambers. It is also desirable in proportioning the parts to have the pipe 29 and port 20 large enough so that any leakage of water from the valve casing 34 along the valve stem 25 into the float chamber 19 will not affect the level of the liquid therein.

While in the accompanying drawing and the foregoing specification the invention has been shown and described as embodied in a gas meter of a particular type, it is to be understood that the invention is not limited to the specific mechanism therein shown and described, but may be embodied in many other forms and arrangements of mechanism. Furthermore, the present invention in its broader aspects is not to be considered as necessarily restricted to any particular type of meter, or even to meters generally, except as so specified in the claims.

Having thus described the present invention, what is claimed is:

1. In a gas handling apparatus, a casing containing a plurality of chambers, the casing being adapted to contain liquid and the chambers being in communication below the normal level of the liquid, different chambers being subjected to different pressures of the gas, and means responsive to variations of pressure of the gas in one of the chambers for maintaining the liquid at the predetermined level in said chamber.

2. A gas meter comprising a casing adapted to contain liquid, a rotating drum in the casing having measuring chambers, the chambers being sealed by the liquid in the casing, and means responsive to variations of pressure of the gas for varying the quantity of liquid contained in the casing to maintain the liquid substantially at the same predetermined height in the measuring chambers under varying pressures of the gas in the chambers.

3. A gas meter comprising a casing adapted to contain liquid, a rotating drum in the casing having measuring chambers, the chambers being sealed by the liquid in the casing, a source of supply of the liquid, and a liquid supply valve responsive to variations in gas pressure to maintain the liquid at substantially the predetermined height in the measuring chambers.

4. A gas meter comprising a casing adapted to contain liquid, a rotating drum in the casing having measuring chambers, the chambers being sealed by the liquid in the casing, a float chamber adapted to contain liquid and in communication with the casing below the normal level of the liquid to permit the flow of liquid between chamber and casing, connections between the float chamber above the normal level of the liquid with the gas supply as it enters the meter, a float in the chamber, a source of liquid supply, a liquid supply valve, and connections between the float and the valve.

5. A gas meter comprising a casing adapted to contain liquid, a rotating drum in the casing having measuring chambers, the chambers being sealed by the liquid in the casing, a gas inlet pipe, a liquid overflow chamber provided with an overflow pipe, connections between the lower portion of said chamber and the casing below the liquid level, connections between the upper portion of said chamber and the gas supply pipe, connections between the casing and a source of liquid supply including means for increasing the quantity of liquid in the casing when the pressure of the gas is increased.

CHARLES W. HINMAN.